US012791655B2

United States Patent

(12) United States Patent
Ghasemian et al.
(10) Patent No.: US 12,791,655 B2
(45) Date of Patent: *Nov. 10, 2026

(54) RADAR SENSOR

(71) Applicant: Aptiv Technologies AG, Schaffhausen (CH)

(72) Inventors: Pedram Ghasemian, Bochum (DE); Dennis Vollbracht, Hilden (DE); Mathias Busch, Wuppertal (DE); Armin Talai, Nuremberg (DE)

(73) Assignee: Aptiv Technologies AG, Schaffhausen (CH)

(*) Notice: Subject to any disclaimer, the term of this patent is extended or adjusted under 35 U.S.C. 154(b) by 181 days.

This patent is subject to a terminal disclaimer.

(21) Appl. No.: 18/628,757

(22) Filed: Apr. 7, 2024

(65) Prior Publication Data

US 2025/0258274 A1 Aug. 14, 2025

(30) Foreign Application Priority Data

Feb. 8, 2024 (EP) .................................... 24156639

(51) Int. Cl.
*G01S 13/931* (2020.01)
*G01S 7/03* (2006.01)

(52) U.S. Cl.
CPC ............ *G01S 7/032* (2013.01); *G01S 13/931* (2013.01); *G01S 2013/93271* (2020.01); *G01S 2013/93275* (2020.01)

(58) Field of Classification Search
CPC ................... G01S 7/032; G01S 13/931; G01S 2013/93271; G01S 2013/93275; H01Q 1/3283; H01Q 1/523; H01Q 1/525; H01Q 1/528; H01Q 15/0053; H01Q 15/0073; H01Q 1/42; H01Q 1/3233
See application file for complete search history.

(56) References Cited

U.S. PATENT DOCUMENTS

2016/0268693 A1* 9/2016 Ding ......................... G01S 7/03
2018/0166791 A1* 6/2018 Kim ......................... H01Q 1/38

FOREIGN PATENT DOCUMENTS

CN 116685862 A * 9/2023 ............. H01Q 17/00
CN 117129995 A 11/2023
EP 4283326 A1 * 11/2023 ............. G01S 7/023

OTHER PUBLICATIONS

Extended European Search Report regarding European Patent Application No. 24156639.7, dated Sep. 5, 2024.

* cited by examiner

*Primary Examiner* — Timothy A Brainard
*Assistant Examiner* — Bongani Jabulani Mashele
(74) *Attorney, Agent, or Firm* — Harness, Dickey & Pierce, P.L.C.

(57) ABSTRACT

A radar sensor which comprises a layer including at least one active region and at least one passive region. The active region includes a plurality of antenna elements being configured to transmit and to receive radar waves, and the passive region is free of antenna elements. The passive region is provided with a diffraction grating surface.

13 Claims, 9 Drawing Sheets

Figure 1B:
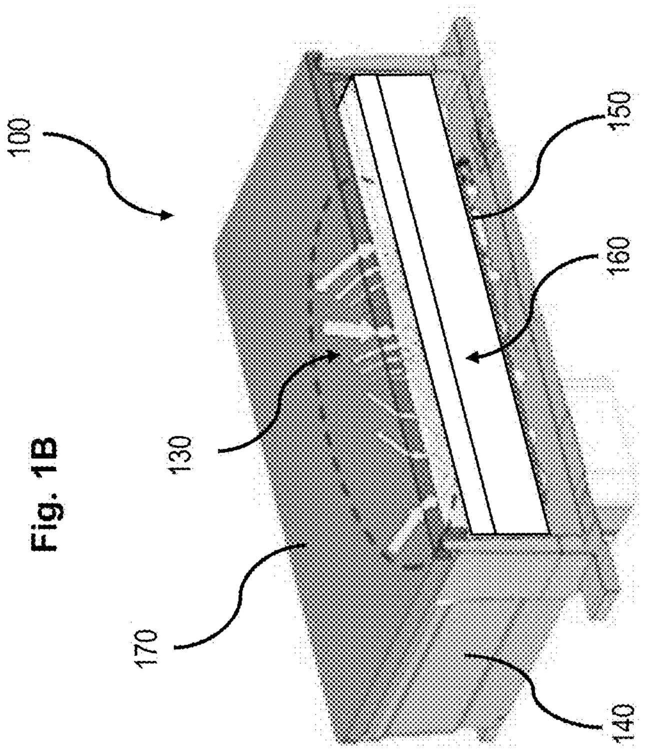

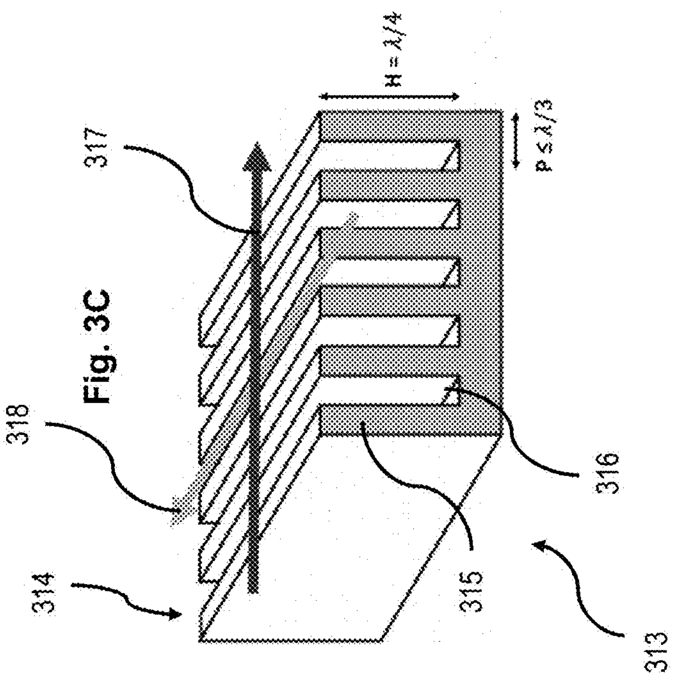
Fig. 3C
H = λ/4
P ≤ λ/3
317
318
314
315
316
313
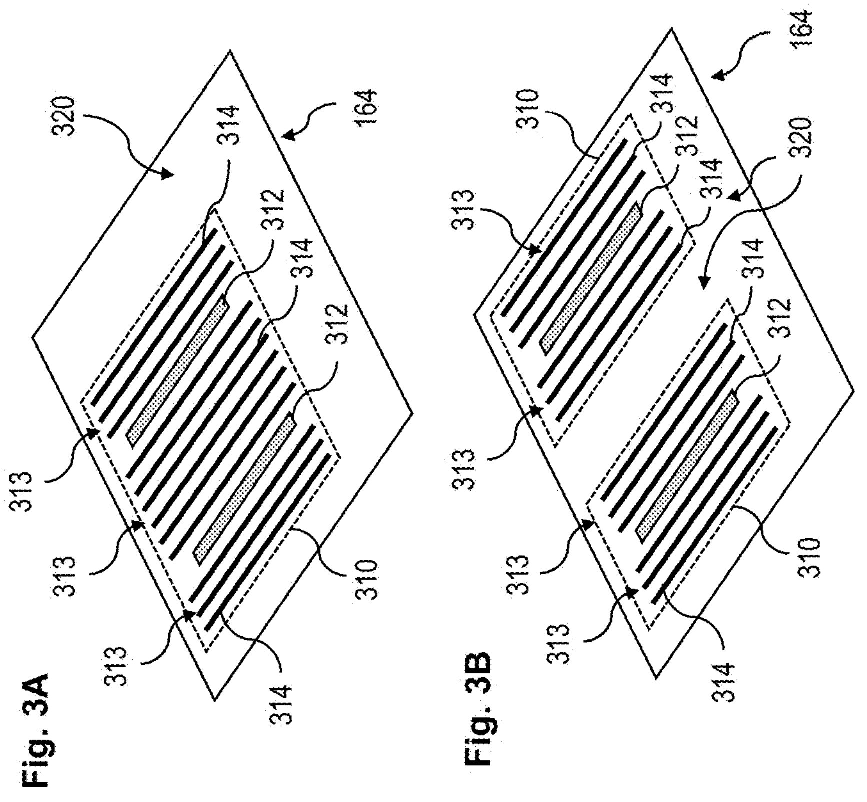
Fig. 3
Fig. 3A
Fig. 3B
320
314
164
312
313
310

H = λ/4 ± λ/16
320
310
312
314
313
400
410
412
414
164
420
422
424
512
513
515
520
530
540
315
316
317

RADAR SENSOR

CROSS-REFERENCE TO RELATED APPLICATIONS

This application claims the benefit and priority of European patent application number 24156639.7, filed on Feb. 8, 2024. The entire disclosure of the above application is incorporated herein by reference.

FIELD

This section provides background information related to the present disclosure which is not necessarily prior art.

The present disclosure relates to a radar sensor which may be an automotive radar sensor being installed on a vehicle.

BACKGROUND

Internal components of an automotive radar sensor are usually mounted in a sensor housing on top of which a radome is placed. The housing and the radome encapsulate and protect internal sensor components from environmental factors like dust, moisture, corrosion, rust and mechanical damage. For aerodynamic and aesthetic reasons, automotive radar sensors are usually integrated in or hidden behind other vehicle components, i.e. behind the outer shell of the vehicle. Such vehicle components may be a bumper, a facia, an emblem etc.

If another vehicle component is placed in front of antennas of an automotive radar sensor, for example, the performance of the radar sensor may be degraded with respect to its ideal performance. This may be due to the fact that the placement of the radar sensor behind the vehicle component may entail disturbing and unwanted effects including radome insertion and transmission losses, a boresight error, antenna main lobe ripples, a shrinkage of the beam width and of the field of view of the radar sensor, an increased level of side lobes, depolarization effects and others. Therefore, the design and the integration of a radome are critical and challenging tasks in automotive radar technologies.

Even if a radome of a radar sensor is properly designed and integrated in a vehicle, most of the above-mentioned disturbing effects may still remain e.g. due to destructive interference caused by specular multibounce reflections between metallic planar surfaces of the radar sensor and vehicle components. Such metallic surfaces may have a high reflectivity for radar waves and may be present within the radar sensor at a top surface of an antenna board and/or of the radome, and in addition at another vehicle component, e.g. a bumper or a facia of the vehicle.

The reflections between metallic surfaces of the radar sensor need also to be considered if a metallic waveguide antenna technology is applied to the radar sensor, e.g. air waveguide (AWG) antennas, ridge gap waveguide (RGW) antennas or groove gap waveguide (GGW) antennas. The metallic waveguide antenna technology generally suffers from its significant structural radar cross-section (RCS) due to the highly reflective metallic planar surfaces which are present in such radar sensors.

To overcome the disturbing effect as described above, known radar sensors may be provided with highly dissipative dielectric materials as absorber layers e.g. on top of antenna boards. By such materials, a good isolation may be achieved between antenna elements, and surface waves as well as multibounce reflections may be efficiently absorbed.

However, the use of such absorbing materials may entail high cost for the radar sensor.

Accordingly, there is a need to have a radar sensor for which disturbing effects are mitigated when the radar sensor is mounted behind or close to another component in a vehicle.

SUMMARY

This section provides a general summary of the disclosure, and is not a comprehensive disclosure of its full scope or all of its features.

The present disclosure provides a radar sensor and a vehicle according to the independent claims. Embodiments are given in the subclaims, the description and the drawings.

In one aspect, the present disclosure is directed at a radar sensor which comprises a layer including at least one active region and at least one passive region. The active region includes a plurality of antenna elements being configured to transmit and to receive radar waves, and the passive region is free of antenna elements. The passive region is provided with a diffraction grating surface.

The radar sensor may comprise different layers including, for example, a layer or a board for electronic components like an MMIC (monolithic microwave integrated circuit), a layer formed as an antenna bottom lid, a layer formed as an antenna top lid and a layer formed as a radome. Within the layer formed as the antenna top lid, the passive region may be located which includes the diffraction grating surface.

The active region may include the antenna elements only without any further items like a structure including corrugations as described below. In other words, the layer of the radar sensor may just include antenna elements and the surface configured as diffraction grating.

Due to the diffraction grating surface, the contribution of the specular multibounce reflections may be scattered out of a radar cone corresponding to a field of view of the radar sensor. Moreover, such a diffraction grating surface may have the ability of tuning and optimizing diffraction modes of the radar waves regarding their scattering patterns.

Due to the diffraction of reflected radar waves in the passive region, specular reflections are reduced and a concentration of reflected energy at boresight is decreased. Hence, a structural radar cross-section in boresight direction is decreased since higher diffraction modes are deflected out of the field of view of the radar sensor. Moreover, different expensive materials, e.g. for absorbers, are not required for the radar sensor which therefore has a highly cost-effective design.

In summary, disturbing effects on the performance of the radar sensor are decreased due to the diffraction grating surface of the passive region. As a consequence, the angle finding performance of the radar sensor is improved, and there may be a coverage improvement in azimuth and elevation angles, respectively. This also holds true if the radar sensor is operated at different frequencies, e.g. within an entire bandwidth of 76 to 81 GHz which is currently used for automotive radar sensors, and also for frequencies beyond 100 GHz, e.g. for frequency bands around 120 GHz being relevant for advanced automotive radar sensors.

According to an embodiment, the diffraction grating surface may include a surface profile in which maxima and minima of the surface profile are arranged periodically. The periodic structure may extend, for example, in two directions being perpendicular to each other. Such a surface profile having the periodically arranged maxima and minima may act as the diffraction grating in order to scatter reflections of radar waves generated by multi-bounce effects out of a region corresponding to an instrumental field of view of the radar sensor. A surface structure including periodic maxima and minima may be manufactured at low cost. As an alternative, the passive region may also include a flat surface which may be provided with internal structures acting as a diffraction grating.

A periodicity of the maxima and minima of the surface profile may be adapted to at least two diffraction modes of the radar waves such that radar waves associated with the at least two diffraction modes may be scattered out of a predefined field of view of the radar sensor. The predefined field of view of the radar sensor may relate to an instrumental or instrumented field of view which may be defined by a certain range in azimuth and elevation angle with respect to a boresight direction of the radar sensor.

The periodicity of the maxima and minima may relate to one or two dimensions or directions within the surface profile. If the surface profile is sinusoidal for two directions, the periodicity may be represented by the frequency of a sine or cosine defining the surface of the surface profile in the respective perpendicular directions.

For example, if the surface profile is formed as a one-dimensional grating, i.e. having periodic structures along one axis only, there are a positive and a negative diffraction mode of first order in addition to a specular reflection as zeroth order. Hence, the periodicity of the one-dimensional grating may be configured such that radar waves of the two diffraction modes of first order are scattered out of the field of view of the radar sensor. As a second example, there are four diffraction modes of first order if the surface profile is formed as a two-dimensional grating having periodic structures along two axes being perpendicular to each other. In this case, the periodicity of the two-dimensional grating may be configured in two directions such that radar waves of the four diffraction modes of first order are scattered out of the field of view of the radar sensor.

Hence, a desired number of diffraction modes of the radar waves may be scattered out of the field of view of the radar sensor by adapting the periodicity of the maxima and minima within the surface profile accordingly. In detail, the diffraction angle of the respective diffraction mode may be directly influenced by the respective periodicity along at least one of the directions. Therefore, it may be possible to control and to optimize the influence of the cross-grating profile on the energy of the incident waves and on the mitigation of specular multibounce reflection effects. In addition, a distance between the maxima and minima, i.e. a height of the surface profile, may determine or define the power or energy distribution over the different diffraction modes.

The maxima and minima of the surface profile may have the same periodicity for two directions being perpendicular to each other. In other words, the surface profile may be symmetric with respect to the two perpendicular directions. For such a surface profile, the scattering behavior of the passive region may be independent from the polarization of the radar waves. Hence, such a passive region having the same periodicity for the maxima and minima in two perpendicular directions may be suitable for a bipolar radar sensor using two different polarization modes.

As an alternative, the maxima and minima of the surface profile may have different periodicities for two directions being perpendicular to each other. Such a configuration of the surface profile of the passive region may be relevant for automotive radars having a wider field of view with respect to the azimuth angle than with respect to the elevation angle. For such a configuration, the periodicity along one axis may be increased, whereas the periodicity along a perpendicular axis may be decreased in comparison to the symmetric surface profile as described above.

Due to the different periodicities of the maxima and minima along the two perpendicular directions or axes, more diffraction modes may be excited e.g. over the azimuth angles for which the automotive radar may have a wider field of view. This may lead to a better distribution of the scattered energy outside the radar cone or field of view such that the suppression of the specular reflection may be enhanced. Such a concept may be suitable for applications using a single polarization.

Furthermore, the surface profile may be sinusoidal for the two directions being perpendicular to each other. This may hold true for the symmetric and for the asymmetric surface profile, i.e. for a surface profile having the same periodicity of the maxima and minima in two perpendicular directions as well as for the surface profile having different periodicity.

According to a further embodiment, a respective dual-purpose structure may be associated with each antenna element of the active region, wherein each dual-purpose structure may be configured to isolate the associated antenna element from the other radar elements with respect to the transmitted and received radar waves. At the same time, each dual-purpose structure may be configured to suppress and to deflect reflections of incident radar waves, i.e. reflections arriving at the dual-purpose structure.

Within the layer formed as the antenna top lid, the respective dual-purpose structure associated with one of the antenna elements may be arranged, e.g. on both sides of the respective antenna element. The dual-purpose structure may include elements which may be able to prevent the surface wave propagation across the respective structure. By a proper alignment of the structure between the antenna elements, the dual-purpose structure may therefore isolate the associated antenna element form the further antenna elements with respect to the propagation of the radar waves therebetween. Hence, disturbing effect between the antenna elements may be reduced or avoided.

At the same time, the elements of the dual-purpose structure may be able to suppress and to deflect reflections of incident radar waves which may be generated e.g. by multi-bounce effects, wherein the incident radar waves may be suppressed by deflecting these radar waves and/or by cancelling out back reflected radar waves due to destructive interference which may also be called "180° out of phase cancellation". For example, radar waves arriving at the dual-purpose structure may be deflected out of a spatial region corresponding to a field of view of the radar sensor, and furthermore, these radar waves may be additionally suppressed by destructive interference. By this means, a structural radar cross-section in boresight direction may be decreased by the dual-purpose structure.

Each dual-purpose structure may include a respective set of corrugations, and each corrugation may include a protrusion and a depression. Each set of corrugations may comprise at least one angled corrugation which may include at least one portion extending in a direction being different from a predefined alignment direction of the associated antenna element.

Since each set of corrugations may include the at least one angled corrugation, specular reflections may be reduced and the concentration of reflected energy at boresight may be further decreased. Moreover, a respective set of corrugations associated with one of the antenna elements may be arranged on both sides of the respective antenna element within the layer formed as antenna top lid. In such a manner, an air waveguide may be formed for isolating the respective antenna element from the further antenna elements within the active region.

According to a further embodiment, the respective set of corrugations may be covered at least partly by a dielectric layer. On top of the corrugations, for example, a material may be located having a dielectric permittivity greater than the dielectric permittivity of air. Due to this, an operational wavelength of the radar waves may be smaller inside the dielectric layer than a "free space" wavelength in air. Therefore, a depth between protrusions and depressions as well as the distance between adjacent protrusions and depressions may be reduced. This may lead to a more compact design of the entire radar sensor. Moreover, a portion of the energy of the incident radar waves may be dissipated within the dielectric layer which may result in a further reduction of the structural radar cross-section.

A pair of protrusions of the corrugations being adjacent to the respective associated antenna elements may extend in parallel to the predefined alignment direction of the respective antenna element. In other words, the first two corrugations around each antenna element may have protrusions extending in parallel to or straight along the respective antenna element. Due to this, an isolation between the antenna elements of the active region may be achieved and maintained while, at the same time, the angled corrugations reduce the structural radar cross-section of the entire layer.

The at least one angled corrugation may include two side portions which are arranged at opposite angles greater than zero with respect to the predefined alignment direction of the associated antenna element. One of the opposite angles may be positive and the other of the opposite angles may be negative with respect to the predefined alignment direction of the associated antenna element. In other words, the side portions may be slanted to the same side with respect to the alignment direction. The size or absolute value of the opposite angles may be the same.

The two side portions being angled or slanted with respect to the alignment direction of the antenna element may reduce the contribution of specular multibounce reflections to the detected radar signal of the radar sensor since this specular multibounce reflections are deflected out of the boresight direction by the angled or slanted side portions of the angled corrugation.

The at least one angled corrugation may also include a middle portion extending in parallel to the predefined alignment direction of the associated antenna element such that the side portions may extend from a respective end of the middle portion. Due to the middle portion extending along the associated antenna element, the respective antenna element may be properly isolated with respect to one or more neighboring antenna elements. However, the side portions may alternatively connect to each other directly without a middle portion therebetween.

Within each side portion of the at least one angled corrugation, the respective protrusion and the respective depression may extend in parallel to each other. More than one angled corrugation having such protrusions and depressions extending in parallel may be arranged adjacent to each other, and all sets of corrugations may include such angled corrugations with protrusions and depressions extending in parallel. Uniform slant angles may be provided for the protrusions and depressions within the side portions of the angled corrugations. Reflections from outer edges of the corrugations may be deflected directly due to the uniform slant. Moreover, the structural radar cross-section of the radar sensor may be decreased via a destructive interference of the radar waves between such angled corrugations.

Alternatively, within each side portion of the at least one angled corrugation, the respective protrusion and the respective depression may be arranged at opposite angles. Again, more than one angled corrugation having such protrusions and depressions arranged at opposite angles may be adjacent to each other, and within each set of corrugations associated with a respective antenna element, there may such angled corrugations having opposite angles of the protrusions and depressions in their side portions. The opposite slant angles of the respective protrusions and depressions may have the same size or absolute value. In addition, ends of the protrusions and depressions of the respective side portions may be connected to each other because of the opposite slant angles. Due to the opposite angles of the protrusions and depressions within the side portions, back reflections of the radar waves may be cancelled out by destructive interference.

In addition, a height of the protrusions with respect to the adjacent depressions, i.e. a maximum height in case of opposite slant angles therebetween, may be equal to a quarter of a wavelength, i.e. an operational wavelength, of the radar waves transmitted by the respective antenna element, wherein the height may have a tolerance of a sixteenth of the wavelength. Due to this, a phase cancellation effect which reduces the structural radar cross-section may be achieved for radar waves arriving at the dual-purpose structure. In addition, the requirements for an isolation functionality may be fulfilled or maintained completely along each antenna element.

The respective set of corrugations may further be a metallic antenna waveguide structure for the associated antenna element. Due to the metallic structure, no expensive dielectric materials may be required, e.g. as absorber layers. Hence, the layers of the radar sensor may be compatible with die cast molding production technologies requiring low cost. However, a dielectric layer may also be located on top of the corrugations as described above in order to enhance the dissipation of the incident radar waves. The set of corrugations may be regarded as an air waveguide (AWG). However, the concept of the angled corrugation may also be suitable for a radar sensor using a ridge gap waveguide (RGW) technology and/or or a groove gap waveguide (GGW) technology.

According to a further embodiment, a respective set of corrugations may be associated with each antenna element in the active region, and at least one set of corrugations may comprise at least one angled corrugation for which protrusions and depressions of respective side portions of the angled corrugation may be arranged at opposite angles, and at the same time, the passive region may be provided with a surface profile in which maxima and minima of the surface profile may have the same periodicity for two directions being perpendicular to each other.

As an alternative, a respective set of corrugations may be associated with each antenna element in the active region, and at least one set of corrugations may comprise at least one angled corrugation for which protrusions and depressions of respective side portions of the angled corrugation may extend in parallel to each other, and at the same time, the passive region may be provided with a surface profile in which maxima and minima of the surface profile may have different periodicities for two directions being perpendicular to each other.

For such configurations, the active region and the passive region may contribute synergistically to the mitigation of the specular multibounce reflection effects, e.g. between an antenna board or layer and a radome of the radar sensor and between the radar sensor per se and a further vehicle component like a facia or a bumper if the radar sensor is installed in a vehicle. Due to such synergistic effects regarding the mitigation of disturbing effects, the structural radar cross-section may be strongly reduced in the boresight direction of the radar sensor.

In another aspect, the present disclosure is directed at a vehicle which comprises a vehicle component and a radar sensor as described above which is arranged in a vicinity of the vehicle component. The vehicle component may be a facia, a bumper or an emblem, for example.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Exemplary embodiments and functions of the present disclosure are described herein in conjunction with the following drawings.

FIG. 1 schematically shows an illustration of a radar sensor installed in a vehicle.

Figure 1A:
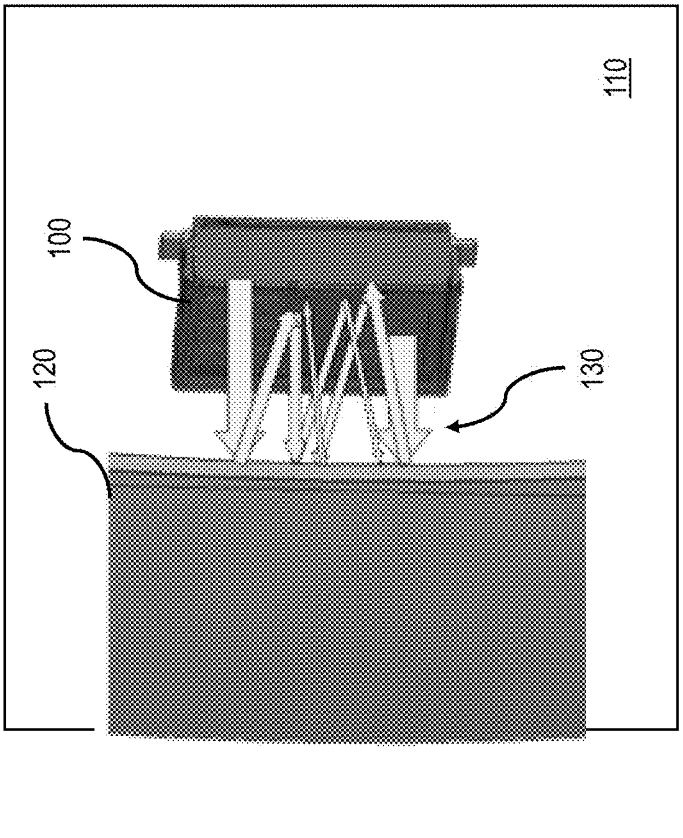
Figure 2:
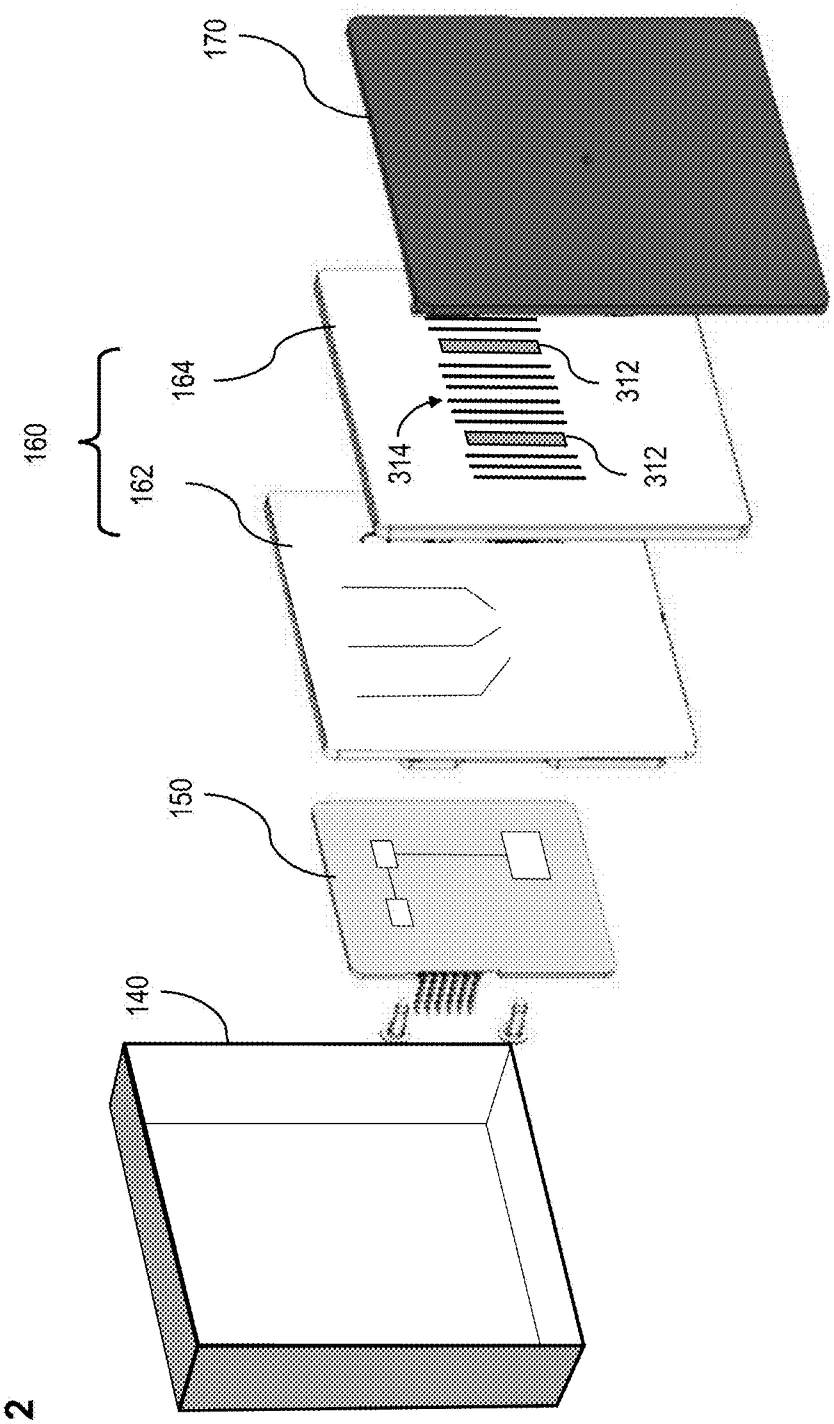

FIG. 2 schematically shows an illustration of an exploded view of the radar sensor as shown in FIG. 1.

FIG. 3 schematically shows an illustration of details for the radar sensor shown in FIGS. 1 and 2.

Figures 4, 4A, 4B, 4C, 4D:
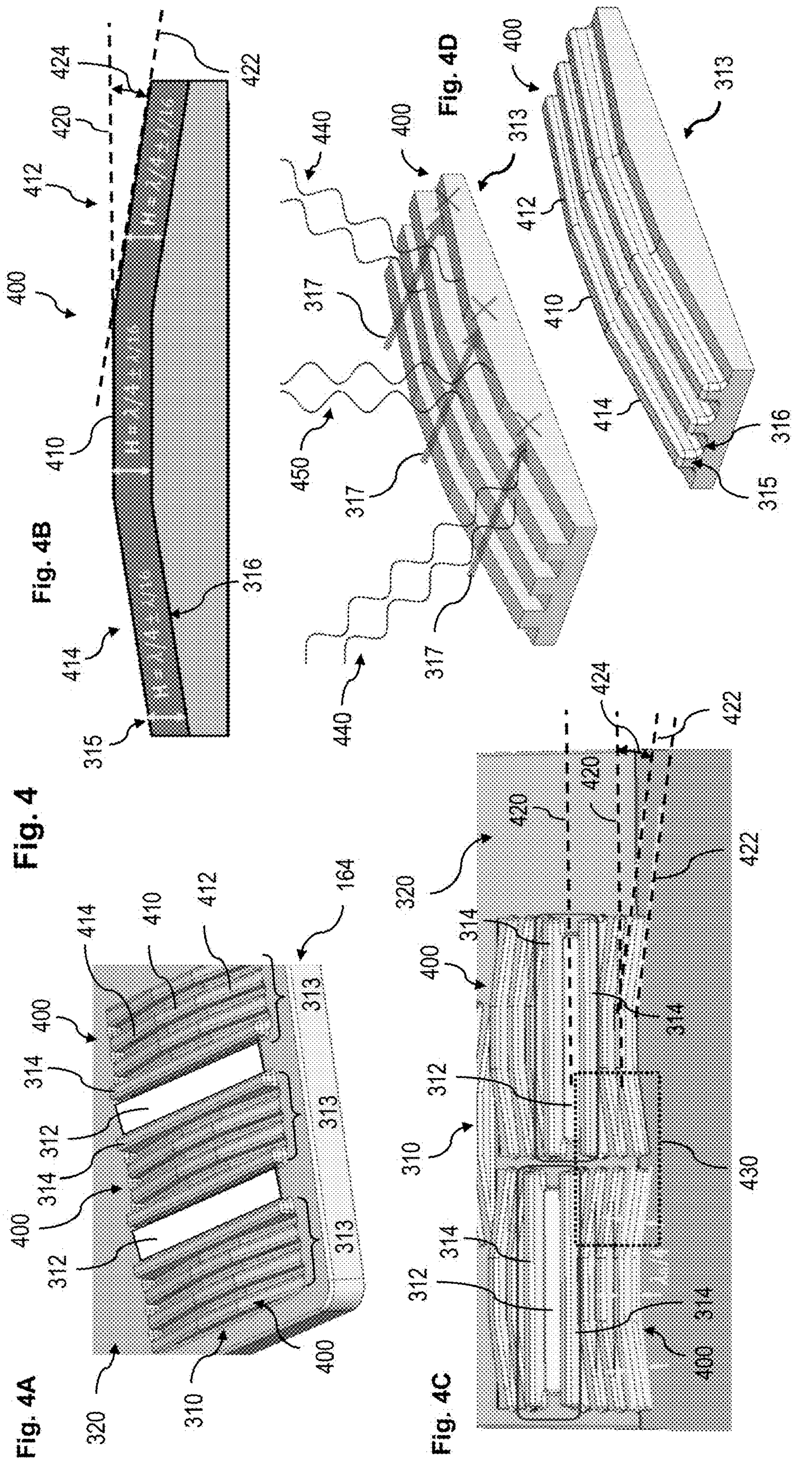

FIG. 4 schematically shows an illustration of an embodiment of the radar sensor including corrugations in an active region of an antenna layer.

Figures 5, 5A, 5B, 5C, 5D:
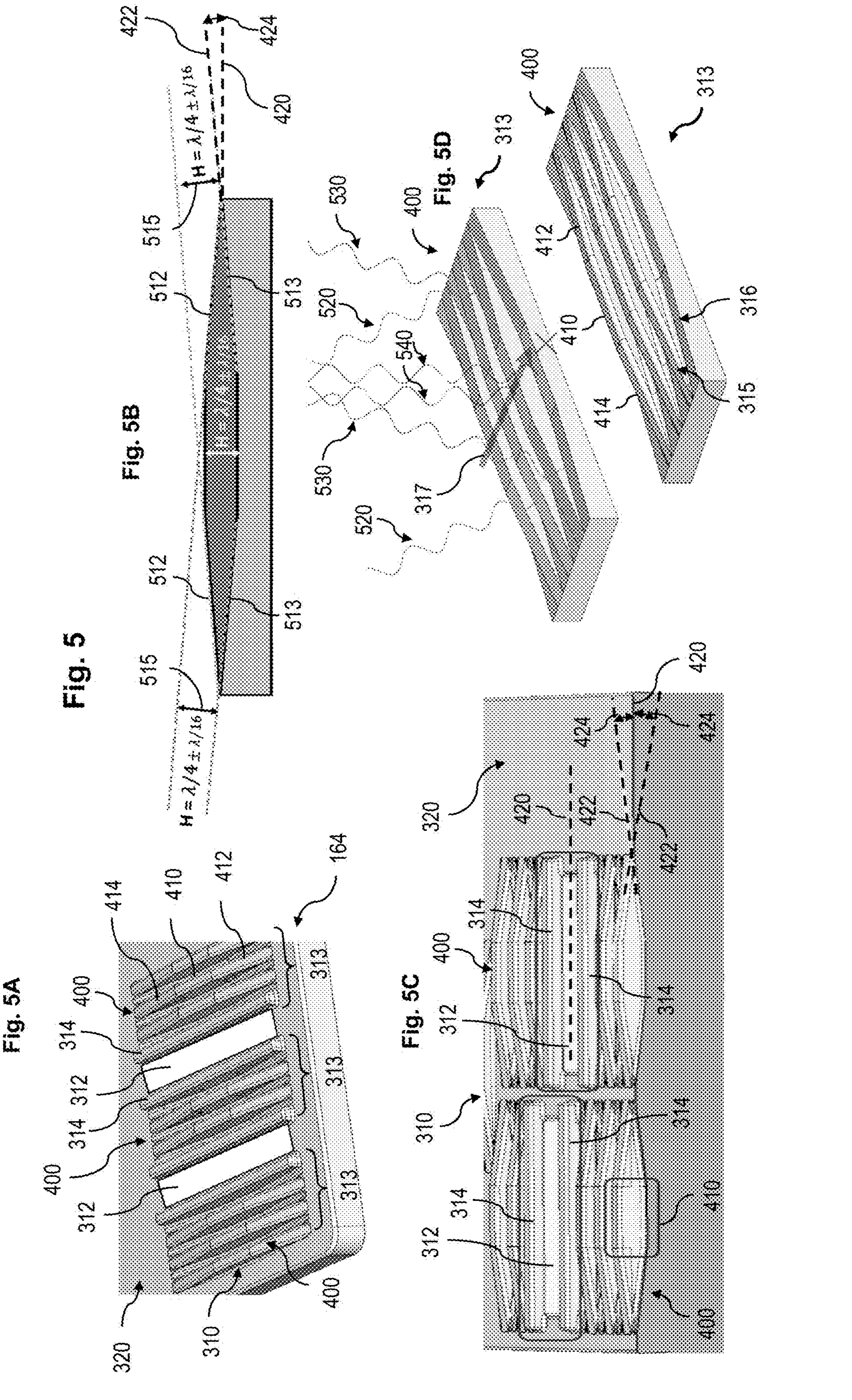

FIG. 5 schematically shows an illustration of a further embodiment of the radar sensor including corrugations in an active region of an antenna layer.

Figure 6:
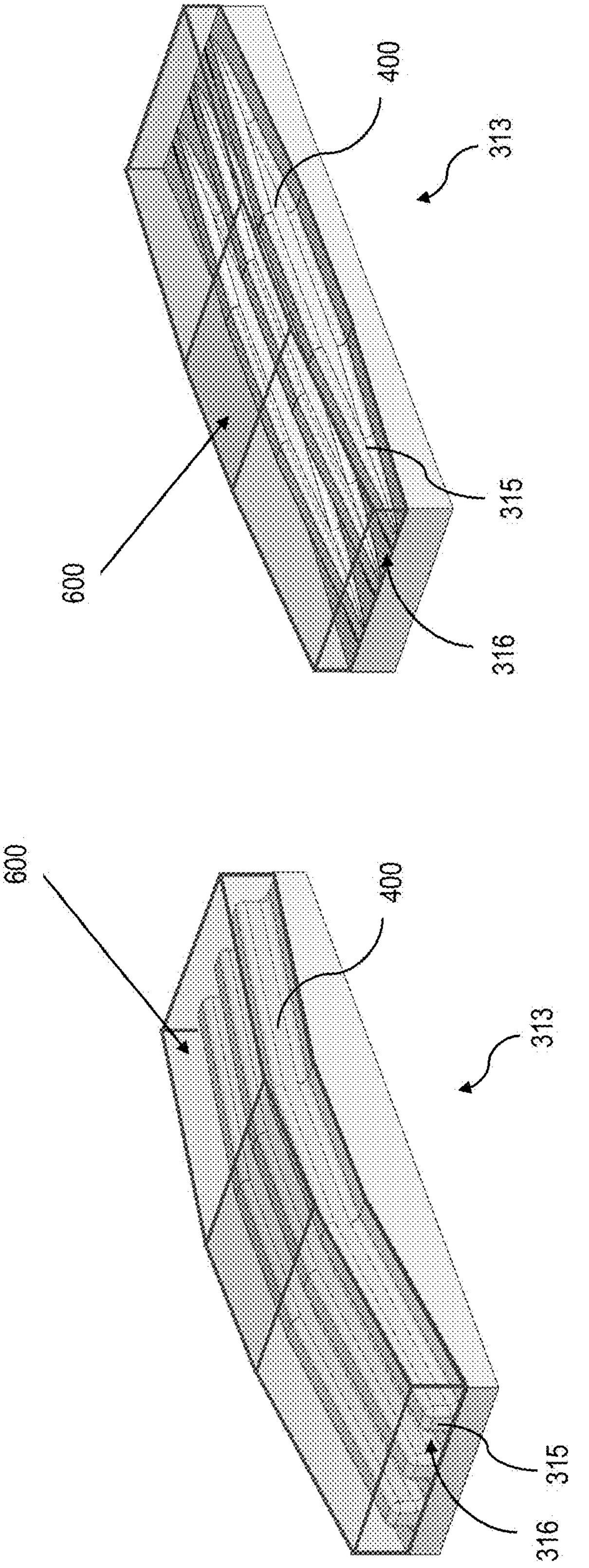

FIG. 6 schematically shows an illustration of corrugations being cover by a dielectric layer.

Figure 7:
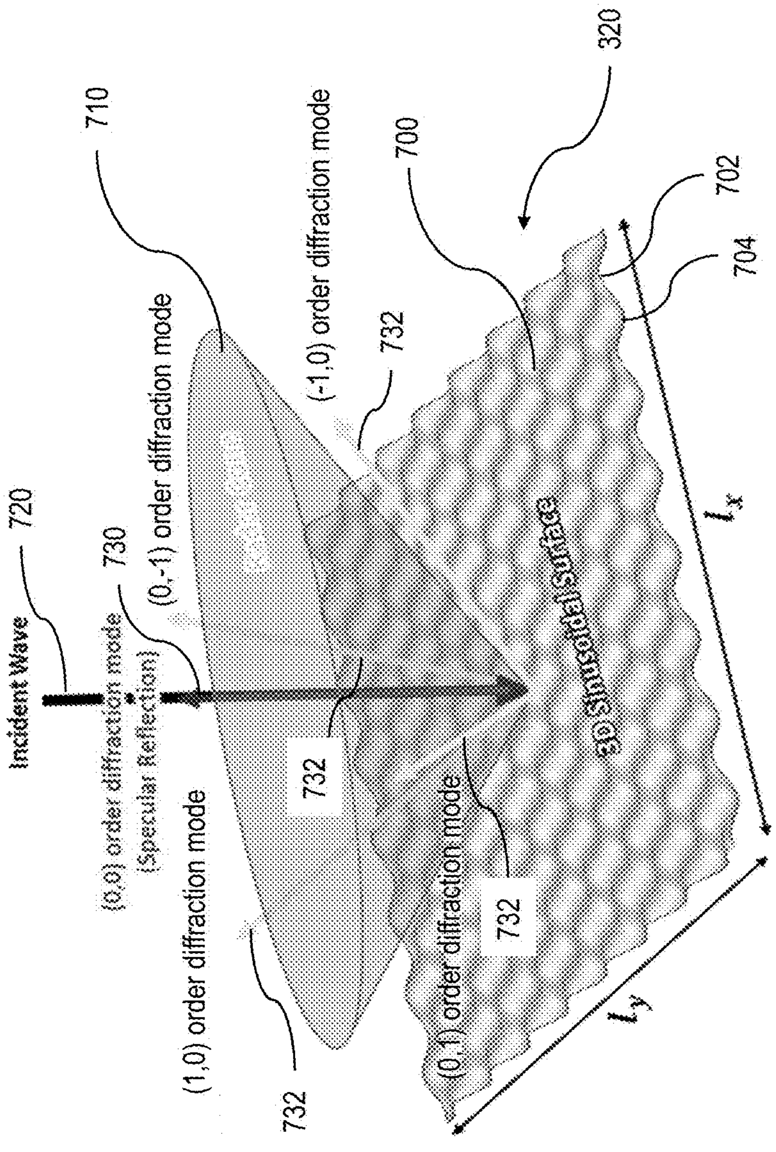

FIG. 7 schematically shows an illustration of a further embodiment of the radar sensor including a sinusoidal surface profile in a passive region of an antenna layer.

Figure 8:
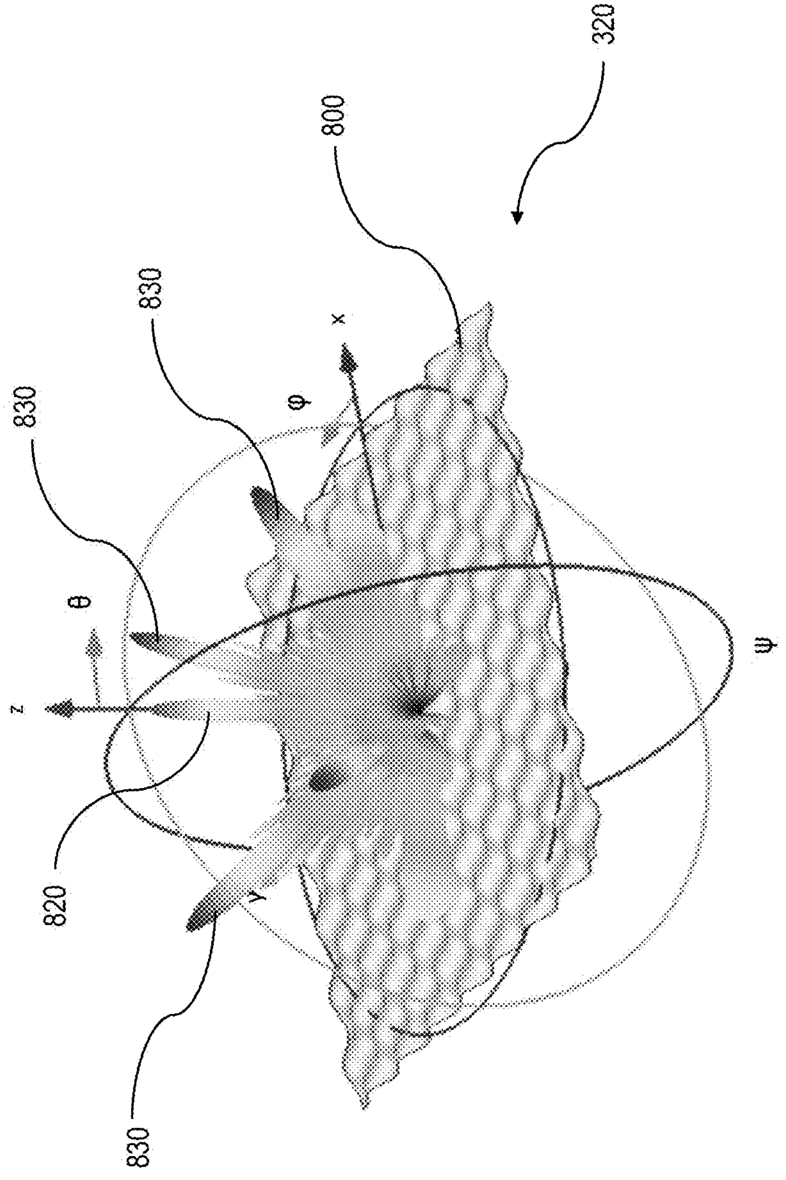

FIG. 8 schematically shows an illustration of a configuration of the sinusoidal surface profile and its diffraction properties for radar waves.

Figure 9:
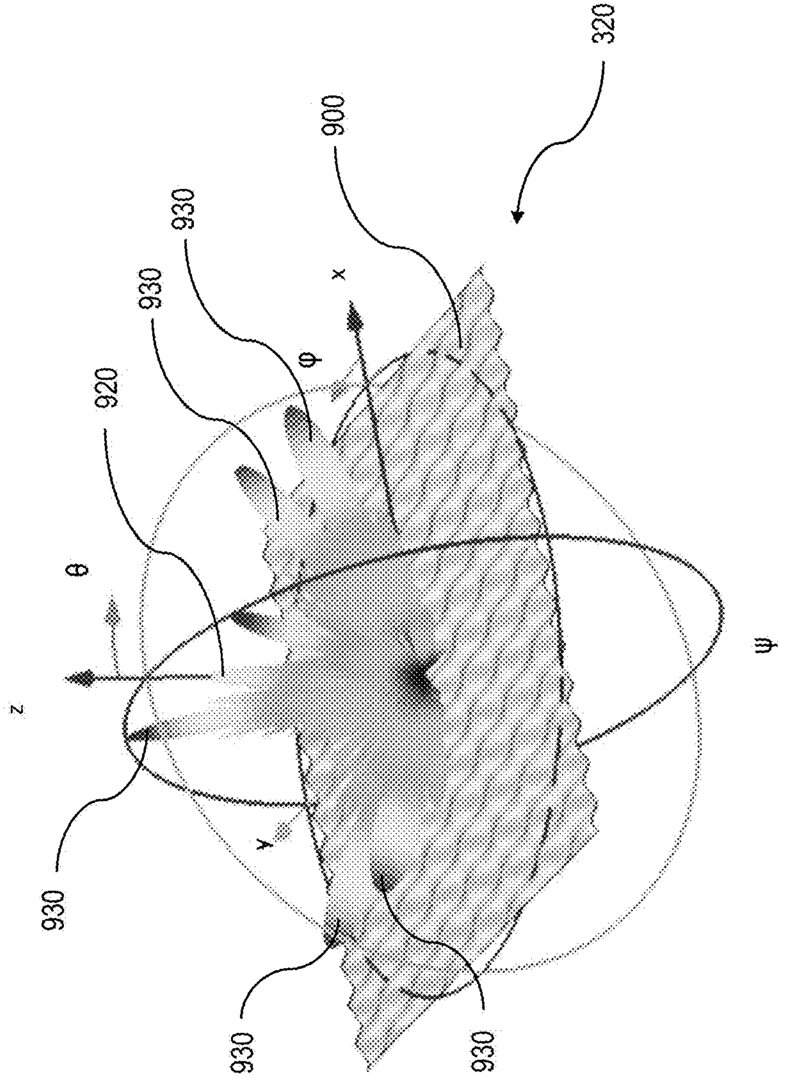

FIG. 9 schematically shows an illustration of a further configuration of the sinusoidal surface profile and its diffraction properties for radar waves.

Corresponding reference numerals indicate corresponding parts throughout the several views of the drawings.

DETAILED DESCRIPTION

Example embodiments will now be described more fully with reference to the accompanying drawings.

FIG. 1A schematically depicts a radar sensor 100 which is installed in a vehicle 110 behind a vehicle component 120, e.g. a bumper or a facia of the vehicle 110. Automotive radar sensors like the radar sensor 100 are generally located behind an outer shell of the vehicle 110 for aesthetic and aerodynamic reasons.

In FIG. 1B, an enlarged perspective view of the radar sensor 100 is depicted. The radar sensor 100 includes a housing 140 in which different boards or layers of the radar sensor are mounted as internal components. These include a board 150 for electronic components like a monolithic microwave integrated circuit (MMIC) and boards or layers 160 for air waveguide (AWG) antennas. In addition, the radar sensor 100 includes a radome 170. The housing 140 and the radome 170 encapsulate and protect the internal components like the boards 150, 160 of the radar sensor 100 from environmental factors like dust, moisture, corrosion, rust and mechanical damages.

The surfaces of the vehicle component 120 and of some boards or layers of the radar sensor 100 are formed as metallic planar surfaces. Therefore, these surfaces have a high reflectivity for radar waves being transmitted by the sensor 100. Due to this, specular multibounce reflections occur which are illustrated by the arrows denoted by 130 in FIGS. 1A and 1B. The specular multibounce reflections 130 may be present between the radar sensor 100 and the vehicle component 120. In addition, the specular multibounce reflections 130 may also be present between the planar metallic surfaces of the radome 170 and the layer or board 160 including the AWG antennas. The reflections 130 are accompanied by unwanted disturbing effects for the performance of the radar sensor 100, such as radome insertion and transmission losses, a boresight error, antenna main lobe ripples, a shrinkage of the beam width and the field of view of the radar sensor 100, increased side-lobe levels and depolarization effects, for example.

Even if the radome 170 is properly designed and mounted for minimizing such unwanted disturbing effects, a majority of these disturbing effects may remain due to the specular reflections. Therefore, the radar sensor 100 according to the disclosure is configured to reduce such disturbing effect as far as possible.

FIG. 2 depicts an exploded view of the radar sensor 100 including the housing 140, the electronic board 150, two antenna boards 160 and the radome 170. The antenna boards 160 include an AWG antenna bottom lid or bottom layer 162 and an AWG antenna top lid or top layer 164 which includes antenna elements 312 and corrugations 314 which are described in detail below.

FIG. 3A depicts an enlarged illustration of the AWG antenna top lid or top layer 164. The layer 164 includes an active region 310 in which the antenna or radiator elements 312 of all transmitting and receiving (Tx and Rx) antennas of the radar sensor 100 are located, and a passive region 320 which is free of the antenna or radiator elements 312.

On both sides of each antenna elements 12, several corrugations 314 are located within the active region 310. Hence, a respective set of corrugations 314 is associated with each antenna element 312 of the active region 310. The respective set of corrugations 314 is also denoted as a dual-purpose structure 313, and the two purposes of the structure 313 will be explained in detail below.

In FIG. 3B, a further embodiment of the layer 164 is depicted. This embodiment includes the same elements as the embodiment of FIG. 3A such that the description of FIG. 3A is also valid for FIG. 3B. The only difference relates to the arrangement of the active region 310 which includes two parts being spatially separated from each other. Hence, the active region 310 is not necessarily a continuous area within the layer 164, but may include different areas which are separated by a part of the passive region 320 which may be located between the different areas of the active region 310.

As shown in FIG. 3C, each of the corrugations 314 of the structure 313 includes a protrusion 315 and a depression 316 which extend along an alignment direction of the respective antenna element 312.

The corrugations 314 provide a cross isolation between adjacent antenna elements 312 by preventing the surface wave propagation across a respective isolation structure 313 (see also FIG. 3C) formed by the corrugations 314 which are arranged between a pair of antenna elements 312. As illustrated by the arrow 317 in FIG. 3C, the corrugations 314 prevent the propagation of radar waves perpendicular to the direction in which the protrusions 315 and the depression 316 of the corrugations 314 extend. In contrast, the propagation of the radar waves is not blocked in a direction parallel to the extension direction of the protrusions 315 and the depressions 316, i.e. in parallel to the alignment direction of the antenna elements 312. This is indicated by the arrow 318 in FIG. 3C.

In other words, the structure 313 including the corrugations 314 as shown in FIG. 3C may be regarded as an electromagnetic soft surface in the direction indicated by the arrow 317 extending perpendicularly to the protrusions 315 and the depressions 316, and as an electromagnetic hard surface in the direction indicated by the arrow 318 extending along the protrusions 315 and the depressions 316. That is, the protrusions 314 act as an air waveguide (AWG) for the radar waves transmitted by the antenna elements 312.

In order to provide a proper isolation between the antenna elements 312 by blocking a surface wave propagation, an isolation structure 313 having at least three corrugations 314 are required per operating wavelength. Moreover, a height H of the protrusions 315 or, correspondingly, a depth of the depression 316 is equal to a quarter of the operational wavelength of the radar waves, wherein the height H has a tolerance of about a sixteenth of the operational wavelength. Moreover, a distance or a pitch P between neighboring protrusions 315 is selected to be smaller than or equal to a third of the operational wavelength.

In order to mitigate the disturbing effects of the specular multibounce reflections 130 as described in context of FIG. 1 above, embodiments of the radar sensor 100 are provided with modified corrugations 400 as shown in FIGS. 4 and 5. That is, at least some corrugations 400 are modified with respect to the straight corrugations 314 as shown in FIG. 3.

FIG. 4A depicts a perspective view for a portion of the layer 164 including the active region 310 and a part of the passive region 320. In the active region 310, the isolation structures 313 are located which are associated with a respective antenna element 312. That is, a respective isolation structure 313 is arranged on both sides of each antenna element 312. In addition to the straight corrugations 314 having a straight protrusion extending in parallel to the respective antenna element 312, the isolation structure further includes corrugations 400 which have two angled side portions 412, 414 in addition to a middle portion 410.

Due to the angled side portions 412, 414 of the corrugations 400, the isolation structure 313 is able to deflect incident radar waves and to cancel out incident radar waves by destructive interference, as will be explained in detail in context of FIG. 4D. In addition to isolating the respective associated antenna element 312 from the further antenna elements 312 of the radar sensor 312, the structure 313 is also configured to suppress and redirect reflections of incident radar waves due to the corrugations 314, 400. Therefore, the structure 313 including the corrugations 314, 400 is denoted as dual-purpose structure 313. Furthermore, the corrugations 400 are denoted as angled corrugations 400 due to their angled side portions 412, 414.

FIG. 4B depicts a side view of one of the angled corrugations 400 which includes a middle portion 410 extending in parallel to an alignment direction 420 of the respective antenna elements 312 (see also FIG. 4C), and angled or slanted side portions 412, 414 extending from respective ends of the middle portion 410. An extension direction of the angled side portions 412, 414 of the corrugations 400 is indicated by 422, and a slant angle between the extension direction 422 of the side portions 412 and the alignment direction 420 of the antenna elements 312 is indicated by the double arrow 424.

FIG. 4C also depicts a perspective view for a further portion of the layer 164 including the active region 310 and a part of the passive region 320, i.e. in a similar manner as FIG. 4A. However, the antenna elements 312 are arranged side by side in the portion as shown in FIG. 4C. The alignment direction 420 of the respective antenna elements 312, the extension direction 422 of the side portions 412 and the slant angle 424 are also shown in FIG. 4C.

The two side portions 412, 414 are arranged at opposite angles 424 with respect to the predefined alignment direction 420 of the respective antenna element 312 associated with a respective set of corrugations 314, 400 which surrounds the antenna element 312 in a direction perpendicular to the alignment direction 420 of the antenna element 312. For the present embodiment, the slant angle 424 is approximately 7 degrees. However, this value is just an arbitrary choice related to the design of the active region 310. Greater or smaller slant angles 424 may also be applied for providing similar technical effects. Accordingly, a slant angle 424 greater than 7 degrees is depicted in FIGS. 4B and 4C.

The angled corrugations 400 of the embodiment as shown in FIG. 4 have uniform slant angles 424 for all side portions 412, 414. That is, the protrusions 315 and the depressions 316 of the angled protrusions 400 extend in parallel over the entire length of the respective angled corrugations 400, as is shown most clearly in FIG. 4B.

The distance H between a top of the protrusions 315 and a bottom of the depressions 316 is uniformly equal to a quarter of the operational wavelength of the radar waves transmitted by the antenna elements 312 in order to maintain a cross isolation functionality between the antenna elements 312, wherein the height H has a tolerance of about a sixteenth of the operational wavelength. The isolation functionality of the structure 313 is also indicated by the arrows 317 in FIG. 4D. In the direction of the arrows 317, the structure 313 is an electromagnetic soft surface, i.e. over the entire length of the corrugations 400 in the middle portion 410 and in the side portions 412, 414.

For maintaining this isolation functionality in a similar manner as for an active region 310 including straight corrugations 314 only as shown in FIG. 3, the protrusions 315 of the corrugations 314 which are adjacent to the respective antenna element 312 on both sides (see FIG. 4A and FIG. 4C) are kept unchanged, i.e. without being provided with the angled side portions 412, 414. In other words, straight corrugations 314 are directly adjacent to the respective antenna element 312 such that the protrusions 315 of the neighboring corrugations 314 of the respective antenna element 312 extend in parallel to the antenna element 312 over their entire length.

In the lower part of FIG. 4D, a perspective view of the dual-purpose structure 313 (see FIG. 4A) is depicted. For sake of clarity, the straight corrugations 314 are omitted such that three angled corrugations 400 are shown only. In the upper part, the same structure is shown in a more schematic and simplified manner.

Due to the angled side portions 412, 414 of the corrugations 314, specular multibounce reflections are directly deflected such that the structural radar cross-section of the layer 164 is reduced. This is illustrated by the waves 440 which are reflected at the respective angled side portion 412, 414 of the angled corrugation 400. In addition, an out-of-phase cancellation occurs for the waves 440 reflected at the protrusion 315 and at the depression 316, respectively, of each angled corrugation 400 due to destructive interference. Such a destructive interference also occurs for waves 450 being reflected at the middle portion 410. In summary, incident radar waves are suppressed by the angled corrugations 400 of the structure 313 due to deflection at the side portions 412, 412 and due to destructive interference in all portions 410, 412, 414.

A further reduction of the structural radar cross-section is caused by a destructive interference of the radar waves within a central region 430 (see FIG. 4C) in which oppositely slanted side portions 412, 414 of different sets of corrugations 400 are facing each other. For the present embodiment, the passive region 320 of the layer 164 is left unchanged with respect to the reference model of the radar sensor 100 as shown in FIG. 3. That is, the passive region 320 includes a flat and uniform surface.

In FIG. 5, a further embodiment is depicted for the layer 164 of the radar sensor 100. Generally, the description provided above for the embodiment as shown in FIG. 4 is also valid for the embodiment as shown for FIG. 5 such that the description of the respective features is not repeated again. FIGS. 5A and 5C depict a respective perspective view of a portion of the layer 164, whereas Fig. B depicts a side view of an angled corrugation 400 according to the present embodiment, and FIG. 5D depicts a perspective view of the structure 313.

The embodiment as shown in FIG. 5 differs from the embodiment as shown in FIG. 4 in that within the structures 313, i.e. within the sets of corrugations 314, 400 associated with some of the antenna elements 312, the angled corrugations 400 have side portions 412, 414 in which the protrusions 315 and the depressions 316 are arranged at opposite slant angles 424. As shown in the side view of FIG. 5B, the protrusion 315 and the depression 316 of the angled corrugation 400 have respective slanted parts 512, 513 which are arranged at opposite slant angles with respect to the alignment direction 420 of the antenna element 312.

Since the protrusions 315 and the depressions 316 have opposite slant angles 424, the protrusions 315 and the depressions 316 of these angled corrugations 400 are connected to each other at the respective end of the corrugations 400 along the respective antenna element 312. In the middle region 410 of the corrugations 400 having such opposite slant angles of the protrusions 315 and of the depressions 316 within their side portions 412, 414, the height H of the protrusion with respect to the depression 316 is still equal to a quarter of the operational wavelength of the radar waves transmitted by the antenna element 312. Such a distance being equal to a quarter wavelength maintains the isolation functionality of the corrugations 314 in the middle region 410. The height H has a tolerance of approximately a sixteenth of the operational wavelength. The isolation functionality is again illustrated by the arrow 317 in the middle portion 410 depicted in FIG. 5D.

Due to these opposite slant angles 424 of the slant parts 512, 513, back reflections of incident radar waves are deflected into different directions, as shown in FIG. 5D by the waves 520, 530. In addition, waves reflected at the same deflection angle as illustrated by the pairs of waves 520, 530, 540 in FIG. 5D, are cancelled out by destructive interference of radar waves. This is valid for the middle portion 410 and for the side portions 412, 414. For the side portions 412, 414, the respective distance 515 between the slanted part 512 of the protrusion 315 of one of the side portions 412, 414 and the slanted part 513 of the depression 316 of the opposing side portion 412, 414 is also approximately equal to a quarter of the operational wavelength, with a tolerance of the sixteenth of the wavelength. This favors the destructive interference between the pairs of waves 520, 530. In summary, the structural radar cross-section of the layer 164 is reduced again by deflection and destructive interference.

Moreover, the slant angle 424 of the oppositely slanted protrusions 315 and depressions 316 with respect to the alignment direction 420 of the antenna elements 312 is again approximately 7 degrees for the present embodiment. As mentioned above, this value is again an arbitrary choice related to the design of the active region 310, and greater or smaller slant angles 424 may also be applied for providing similar technical effects. Accordingly, a slant angle 424 greater that 7 degrees is shown in FIG. 5 for illustration reasons.

According to a further embodiment as shown in FIG. 6, the dual-purpose structure 313 and the respective set of corrugations 314, 400 is covered at least partly by a dielectric layer 600. On the left side of FIG. 6, three angled corrugations 400 are depicted which have uniformly slanted protrusions 315 and depressions 316, i.e. extending in parallel according to the embodiment as shown in FIG. 4. On the right side of FIG. 6, in contrast, three angles corrugations 400 are depicted which have oppositely slanted protrusions 315 and depressions 316, i.e. arranged at opposite angles with respect to the alignment direction 420 of the antenna elements 312 according to the embodiment as shown in FIG. 5.

On top of the corrugations, a material is therefore located which has a dielectric permittivity greater than the dielectric permittivity of air. Due to this, an operational wavelength of the radar waves is smaller inside the dielectric layer than a "free space" wavelength in air. Therefore, the depth H (the FIG. 3) of depressions 316 between the protrusions 315 and the respective distance P between adjacent protrusions 315 and depressions 316 can be reduced in comparison to embodiments in which the corrugations 314, 400 are not covered by the dielectric layer 600. This leads to a more compact design of the entire radar sensor 100. Moreover, a portion of the energy of the incident radar waves is dissipated within the dielectric layer 600 which results in a further reduction of the structural radar cross-section.

FIGS. 7, 8 and 9 depict other embodiments of the radar sensor 100 for which the passive region 320 of the layer 164 (see also FIG. 3) has a diffraction grating surface 700, 800, 900 such that the scattering pattern of the radar waves at the passive region is optimized in a special manner. For the embodiments as shown in FIGS. 7, 8 and 9, the surface 700, 800, 900 of the passive region 320 is sinusoidal for two directions perpendicular to each other, i.e. along the lengths $l_x$ and $l_y$ as indicated in FIG. 7. The sinusoidal surface profile 700 of the passive region 320 can be analytically described by the following equation:

$$z = f(x, y) = h\cos\left(\frac{2\pi x}{P_x}\right)\sin\left(\frac{2\pi y}{P_y}\right) \quad (1)$$

wherein z denotes the local height of the surface profile 700 with respect to a plane surface (x-y-plane), h is an amplitude or height factor of the profile, $P_x$ is a period length along the x-axis, and $P_y$ is a period length along the y-axis. Hence, $P_x$ and $P_y$ determine the periodicity or frequency along of the sinusoidal profile in two directions being perpendicular to each other.

Such a sinusoidal surface profile 700 acts as a cross diffraction grating such that reflected radar waves, e.g. from a radome, a facia or bumper, are deflected over a wide range of angles to the outside of a field of view of the radar sensor. Generally, a surface profile having a periodic structure in two perpendicular directions is suitable for providing this technical effect of deflecting radar waves by diffraction. It is therefore not necessary that the surface profile 700 is sinusoidal. Instead, just a regular or periodic structure of maxima 702 and minima 704 is required for the surface profile 700.

In FIG. 7, a radar cone 710 corresponds to a field of view of the radar sensor 100. An incident wave 720 which may be caused by a reflection at a radome, facia or bumper causes a specular reflection 730 within the field of view or radar cone 710, i.e. a (0,0) order diffraction mode 730, whereas higher order diffraction modes 732 are deflected out of the radar cone or field of view 710 of the radar sensor due to their diffraction of the radar waves at the surface profile 700. Hence, the energy or intensity of the specular reflection 730 is strongly reduced since the higher order diffraction modes 732 are scattered or deflected out of the radar cone 710. Therefore, the specular multibounce reflections 130 (see FIG. 1) are also strongly decreased by surface profile 700 of the passive region 320.

The sinusoidal surface profile 700 as described by the above formula (1) provides the ability of tuning and optimizing diffraction modes regarding their scattering pattern to be out of the radar cone or field of view of the radar sensor 100. Generally, such scattering pattern of structured metallic surfaces may be described either by the periodic reflect array theorem, or anomalous reflections of diffraction grating structures may be described by a generalized Snell's law in the reflection regime.

When considering the analytic formula (1) as provided above, there are three parameters by which the scattering patterns of the surface profile 700 can be optimized. The amplitude or height factor h directly influences the power distribution over the different diffraction modes. The period lengths $P_x$ and $P_y$ along the x-axis and the y-axis, respectively, define the number and diffraction angles of possible diffraction modes along the x-axis and along the y-axis.

For the embodiment of the radar sensor 100 as shown in FIG. 8, a surface profile 800 of the passive region 320 is provided with the same periodicity or period length along the x-axis and the y-axis, i.e. $P_x=P_y$. Hence, the surface profile 800 may also be referred to as a symmetric sinusoidal profile. In FIGS. 8 and 9, the angle θ denotes an azimuth angle and the angle ψ denotes an elevation angle with respect to a boresight direction along the z axis.

The respective intensity of the different diffraction modes is depicted in FIG. 8 via respective polar representations, wherein the intensity of the specular reflection is denoted by 820 and the respective intensity of the higher diffraction modes is denoted by 830. As can be recognized in FIG. 8, the majority of the incident wave intensity is transferred to the higher diffraction modes. Accordingly, the intensity 820 of the specular reflection is strongly reduced in comparison to the incident intensity.

Due to the same periodicities $P_x$, $P_y$ of the surface profile 800 along the x-axis and the y-axis, the surface profile 800 of the passive region 320 has a scattering behavior being independent from the polarization of the transmitted radar waves. Therefore, the surface profile 800 being symmetric sinusoidal regarding the spatial period is suitable for a bipolar radar sensor using two different polarization modes.

Since many automotive radar sensors have a wider field of view regarding the azimuth angle θ than regarding the elevation angle ψ, a further embodiment of the radar sensor 100 as shown in FIG. 9 includes a surface profile 900 of the passive region 320 which has different periodicities along the x-axis and the y-axis. With respect to the equal periodicities for both axes as shown in FIG. 8, the periodicity or period length $P_y$ is increased along the y-axis, whereas the periodicity or period length $P_x$ is decreased along the x-axis.

Regarding the periodicities of maxima and minima in the x- and y-directions, the sinusoidal surface profile 900 has therefore an asymmetric design. Due to this, more diffraction modes can be excited over the azimuth angle such that the intensity of the higher diffraction modes being scattered out of the radar cone or field of view of the radar sensor 100 is increased. This can be recognized by the polar representation of the intensity of the higher diffraction modes which is respectively denoted by 930. Consequently, the intensity of the specular reflection which is denoted by 920 is even more suppressed in comparison to the intensity 820 as shown in FIG. 8. The asymmetric surface profile 900 as shown in FIG. 9 is suitable for radar sensors 100 which use a single polarization mode.

In order to investigate the feasibility of the concepts described above, a respective bistatic radar cross-section (RCF) of the top antenna lid or layer 164 (see FIGS. 2 and 3) has been simulated for different models across an entire relevant frequency band from 76 GHz to 81 GHz. For this simulation, an incident wave illuminating from the boresight and a purely horizontal polarization have been assumed as a prerequisite.

Model 1 (M1) used as a reference model is depicted e.g. in FIG. 3A or 3B and has straight corrugations 314 only in the active region 310 and a flat profile in the passive region 320. Model 2 (M2) is depicted in FIG. 8 and has the symmetric sinusoidal surface profile 800 in the passive region 320 only, but just straight corrugations 314 and no angled corrugations 400 in the active region. Model 3 (M3) is depicted in FIG. 5 and has corrugations 400 with opposite slant angles 424 of the protrusions 315 and the depressions 316 in the active region 310 only, but a flat passive region 320 without a diffraction grating surface. Model 4 (M4) is a combination of the embodiments as shown in FIG. 5 and FIG. 8. Therefore, M4 has the symmetric sinusoidal surface profile 800 in the passive region 320 (see FIG. 8) and corrugations 400 with opposite slant angles 424 of the protrusions 315 and the depressions 316 in the active region 310 (see FIG. 5).

Model 5 (M5) has the asymmetric sinusoidal surface profile 900 in the passive region 320 only (see FIG. 9), but just straight corrugations 314 and no angled corrugations 400 in the active region 310. Conversely, model 6 (M6) is provided with the corrugations 400 with uniform slant angles 424 in the active region 310 only (see FIG. 4) but with a flat surface profile in the passive region 320 without a diffraction grating surface. Finally, model 7 (M7) is a combination of the embodiments as shown in FIG. 9 and FIG. 4. Therefore, M7 has the asymmetric sinusoidal surface profile 900 in the passive region 320 (see FIG. 9) and the angled corrugations 400 with uniform slant angles 424 in the active region 310 (see FIG. 4).

The simulation results for the different models M1 to M7 are summarized in the table below. As can be recognized from the results for the models M2, M3, M5 and M6, the embodiment having either slanted corrugations 400 in the active region 310 or a sinusoidal surface profile 800 or 900 in the passive region 320 already lead to a significant reduction of the RCS value. However, the model M4 and M7 having a sinusoidal surface profile in the passive region and slanted corrugations in the active region 310 have a strongly reduced structural radar cross-section ratio (RCSR ratio), i.e. an RCSR ratio of approximately 10 dB across the entire frequency band from 76 to 81 GHz. It is noted that the model M4 having the symmetric sinusoidal surface profile 800 and oppositely slanted corrugations 400 as well as the model M7 having an asymmetric sinusoidal surface profile 900 and uniformly slanted corrugations 400 show the best results.

| | 76.5 GHz | | 81 GHz | |
|---|---|---|---|---|
| Simulation Model | RCS value (dBsm) | RCSR Ratio (dB) | RCS value (dBsm) | RCSR Ratio (dB) |
| M1: Reference model (FIG. 3) | 9.32 | NA | 9.76 | NA |
| M2: Symmetric sinusoidal profile in passive region only (FIG. 7) | 1.14 | 8.18 | 2.10 | 7.66 |
| M3: Corrugations with opposite slant angles in active region only (FIG. 5) | 1.93 | 7.39 | 2.22 | 7.54 |
| M4: Symmetric sinusoidal profile in passive region (FIG. 7) and corrugations with opposite slant angles in active region (FIG. 5) | −1.46 | 11.78 | −1.22 | 10.98 |
| M5: Asymmetric sinusoidal profile in passive region only (FIG. 8) | 4.12 | 5.20 | 4.75 | 5.01 |
| M6: Corrugations with uniform slant angles in active region only (FIG. 4) | 6.29 | 3.03 | 5.79 | 3.97 |
| M7: Asymmetric sinusoidal profile in passive region (FIG. 8) and corrugations with uniform slant angles in active region (FIG. 4) | −0.39 | 9.70 | −0.49 | 10.25 |

In addition, the impact of a facia on the azimuth and elevation coverage has been simulated for the models M1 to M7 described above. For the simulations, the radar sensor 100 including the models M1 to M7, respectively, has been combined with a fascia having a reflectivity of −14 dB and an elevation pitch of −4°. It has turned out that model M2 having the symmetric sinusoidal surface profile 800 in the passive region 320 (see FIG. 8) already improves the azimuth and elevation coverage, i.e. even without the angled corrugations 400 as shown in FIGS. 4 and 5. Moreover, the model M4 having the symmetric sinusoidal surface profile 800 in the passive region 320 and the corrugations 400 with opposite slant angles of the protrusions 315 and the depressions 316 (see FIG. 5) further improves the radar integration result over the related art as provided by model M1.

Therefore, the radar sensor 100 having the angled corrugations 400 in the active region 310 and/or one of the sinusoidal surface profiles 800, 900 in the passive region 320 shown improved capabilities regarding angle finding.

According to the disclosure, a radar sensor may comprise a layer including at least one active region and at least one passive region, the active region including a plurality of antenna elements being configured to transmit and to receive radar waves, and the passive region being free of antenna elements. The passive region may be provided with a diffraction grating surface.

According to various embodiments, the diffraction grating surface may include a surface profile in which maxima and minima of the surface profile are arranged periodically.

According to various embodiments, the surface profile may be sinusoidal for two directions being perpendicular to each other.

According to various embodiments, a periodicity of the maxima and minima of the surface profile may be adapted to at least two diffraction modes of the radar waves such that the radar waves associated with the at least two diffraction mode are scattered out of a predefined field of view of the radar sensor.

According to various embodiments, the maxima and the minima of the surface profile may have the same periodicity for two directions being perpendicular to each other.

According to various embodiments, the maxima and the minima of the surface profile may have different periodicities for two directions being perpendicular to each other.

According to various embodiments, a respective dual-purpose structure may be associated with each antenna element in the active region, wherein each dual-purpose structure may be configured to isolate the associated antenna element from the other antenna elements with respect to the transmitted and received radar waves and to suppress and redirect reflections of incident radar waves.

According to various embodiments, each dual-purpose structure may include a respective set of corrugations, each corrugation including a protrusion and a depression. Each set of corrugations may comprise at least one angled corrugation which may include at least one portion extending in a direction being different from a predefined alignment direction of the associated antenna element.

According to various embodiments, the respective set of corrugations may be covered at least partly by a dielectric layer.

According to various embodiments, a pair of protrusions of the corrugations being adjacent to the respective antenna element may extend in parallel to the predefined alignment direction of the respective antenna element.

According to various embodiments, the at least one angled corrugation may include two side portions which may be arranged at opposite angles greater than zero with respect to the predefined alignment direction of the associated antenna element.

According to various embodiments, the respective protrusion and the respective depression within each side portion of the at least one angled corrugation may extend in parallel to each other.

According to various embodiments, the respective protrusion and the respective depression within each side portion of the at least one angled corrugation may be arranged at opposite angles.

According to various embodiments, the respective set of corrugations may be a metallic antenna waveguide structure for the associated antenna element.

According to various embodiments, a respective set of corrugations may be associated with each antenna element in the active region, and at least one set of corrugations may comprise at least one angled corrugation for which protrusions and depressions of respective side portions of the angled corrugation are arranged at opposite angles, and the passive region may be provided with a surface profile in which maxima and minima of the surface profile may have the same periodicity for two directions being perpendicular to each other.

According to various embodiments, a respective set of corrugations may be associated with each antenna element in the active region, and at least one set of corrugations may comprise at least one angled corrugation for which protrusions and the depressions of respective side portions of the angled corrugation may extend in parallel to each other, and the passive region may be provided with a surface profile in which maxima and minima of the surface profile may have different periodicities for two directions being perpendicular to each other.

Furthermore, a vehicle may comprise a vehicle component and a radar sensor as described above which may be arranged in a vicinity of the vehicle component.

REFERENCE NUMERAL LIST

100 radar sensor
110 vehicle
120 vehicle component, e.g. facia or bumper
130 specular multibounce reflections
140 housing
150 electronic board
160 antenna layer
162 antenna bottom lid
164 antenna top lid
170 radome
310 active region
312 antenna element
313 dual-purpose structure
314 straight corrugation
315 protrusion
316 depression
317 electromagnetic soft surface
318 electromagnetic hard surface
400 angled corrugation
410 middle portion
412 side portion
414 side portion
420 alignment direction of antenna element
422 extension direction of angled corrugation
424 slant angle
430 area with oppositely slanted side portions
440 wave deflected at side portion
450 wave deflected at middle portion
512, 513 oppositely slanted parts
520 wave deflected at side portion
530 wave deflected at side portion
540 wave deflected at middle portion
600 dielectric layer
700 sinusoidal surface profile of passive region
710 radar cone or field of view
720 incident wave
730 specular reflection or zero order diffraction mode
732 higher diffraction mode
800 symmetric sinusoidal profile
820 intensity of specular reflection
830 intensity of higher diffraction modes
900 asymmetric sinusoidal profile
920 intensity of specular reflection
930 intensity of higher diffraction modes

What is claimed is:

1. A radar sensor, comprising:

a layer including at least one active region and at least one passive region, the active region including a plurality of antenna elements being configured to transmit and to receive radar waves, and the passive region being free of antenna elements, wherein the passive region is provided with a diffraction grating surface, in the active region, a respective dual-purpose structure is associated with each antenna element, each dual-purpose structure being configured to isolate the associated antenna element from the other antenna elements with respect to the transmitted and received radar waves and to suppress and redirect reflections of incident radar waves, each dual-purpose structure includes a respective set of corrugations, each corrugation including a protrusion and a depression, and each set of corrugations comprises at least one angled corrugation which includes at least one portion extending in a direction being different from a predefined alignment direction of the associated antenna element.

2. The radar sensor according to claim 1, wherein the diffraction grating surface includes a surface profile in which maxima and minima of the surface profile are arranged periodically.

3. The radar sensor according to claim 1, wherein a periodicity of the maxima and minima of the surface profile is adapted to at least two diffraction modes of the radar waves such that radar waves associated with the at least two diffraction modes are scattered out of a predefined field of view of the radar sensor.

4. The radar sensor according to claim 1, wherein the maxima and the minima of the surface profile have the same periodicity for two directions being perpendicular to each other.

5. The radar sensor according to claim 1, wherein the maxima and the minima of the surface profile have different periodicities for two directions being perpendicular to each other.

6. The radar sensor according to claim 1, wherein the respective set of corrugations is covered at least partly by a dielectric layer.

7. The radar sensor according to claim 1, wherein a pair of protrusions of the corrugations being adjacent to the respective antenna element extends in parallel to the predefined alignment direction of the respective antenna element.

8. The radar sensor according to claim 1, wherein the at least one angled corrugation includes two side portions which are arranged at opposite angles greater than zero with respect to the predefined alignment direction of the associated antenna element.

9. The radar sensor according to claim 8, wherein within each side portion of the at least one angled corrugation, the respective protrusion and the respective depression extend in parallel to each other.

10. The radar sensor according to claim 8, wherein within each side portion of the at least one angled corrugation, the respective protrusion and the respective depression are arranged at opposite angles.

11. The radar sensor according to claim 1, wherein at least one set of corrugations comprises at least one angled corrugation for which protrusions and depressions of respective side portions of the angled corrugation are arranged at opposite angles, and the passive region is provided with a surface profile in which maxima and minima of the surface profile have the same periodicity for two directions being perpendicular to each other.

12. The radar sensor according to claim 1, wherein at least one set of corrugations comprises at least one angled corrugation for which protrusions and depressions of respective side portions of the angled corrugation extend in parallel to each other, and the passive region is provided with a surface profile in which maxima and minima of the surface profile have different periodicities for two directions being perpendicular to each other.

13. A vehicle, comprising:

a vehicle component and the radar sensor according to claim 1, which is arranged in a vicinity of the vehicle component.

* * * * *